United States Patent
Goldrian et al.

(10) Patent No.: US 7,349,388 B1
(45) Date of Patent: Mar. 25, 2008

(54) BUFFERED CROSSBAR SWITCH AND ITS METHOD OF OPERATION

(75) Inventors: Gottfried Andreas Goldrian, Boeblingen (DE); Bernd Leppla, Buchen-Bodeigheim (DE); Norbert Schumacher, Neuhausen (DE)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 10/334,218

(22) Filed: Dec. 30, 2002

(30) Foreign Application Priority Data

Jan. 3, 2002 (EP) .................................. 02000021

(51) Int. Cl.
*H04L 12/50* (2006.01)
*H04L 12/56* (2006.01)

(52) U.S. Cl. ........................ 370/388; 370/412; 370/429

(58) Field of Classification Search ........ 370/412–419, 370/380–383, 386–388, 427–429
See application file for complete search history.

(56) References Cited

U.S. PATENT DOCUMENTS 6,449,283 B1 * 9/2002 Chao et al. ................. 370/461
6,909,710 B1 * 6/2005 Goldrian et al. ............ 370/352
6,915,372 B2 * 7/2005 Magill et al. ............... 710/317
7,154,885 B2 * 12/2006 Nong .......................... 370/380
2003/0063618 A1 * 4/2003 Khacherian et al. ........ 370/413

OTHER PUBLICATIONS

Javidi et al., A high-throughput scheduling algorithm for a buffered crossbar switch fabric, Communications, 2001 . ICC 2001. IEEE International Conference on vol. 5, Jun. 11-14, 2001, pp. 1586-1591.*

Yoshigoe et al., A parallel-polled virtual output queued switch with a buffered crossbar, High Performance Switching and Routing, 2001 IEEE Workshop on May 29-31, 2001, pp. 271-275.*

* cited by examiner

*Primary Examiner*—Chi Pham
*Assistant Examiner*—Tri H. Phan
(74) *Attorney, Agent, or Firm*—John E. Cambell; Floyd A. Gonzalez

(57) ABSTRACT

The present invention relates to a buffered crossbar switch and its method of operation which provides a step of changing the size and/or number of queuing buffer entries to ensure optimum buffer memory usage independent of the size of data packets processed.

6 Claims, 2 Drawing Sheets

BUFFERED CROSSBAR SWITCH AND ITS METHOD OF OPERATION

BACKGROUND OF THE INVENTION

The present invention relates to a buffered crossbar switch and its method of operation, in particular of changing the queuing buffer memory organization of a buffered crossbar switch.

Crossbar switches connect a plurality of input/output ports one to another. Data packets arriving at one of the input ports are routed to specific output ports.

Buffered crossbar switches have queuing buffers for temporarily storing data packets that cannot be routed to a specified output port instantly, which is possible since several concurrent routing operations may be performed.

Crossbar switches are frequently used in multi-processor computer systems with distributed memory architecture e.g. for linking processors with resources such as cache memory and other subsystems. Internet switch networks and similar high-performance communication networks also make use of crossbar switches.

In view of the high bit rate demands of the previously named applications, state of the art crossbar switches are designed for scalability to form expanded crossbar switches with a plurality of scalable crossbar switches working in parallel. This operation mode is referred to as expansion mode and it is characterized in that incoming data packets are divided into smaller portions each of which is processed by one of the scalable crossbar switches.

A general buffered crossbar architecture is depicted in FIG. 1 which will be referred to in the following explanations. This architecture is characterized by a plurality of input ports $i1, i2, i3, i4$, a plurality of output ports $o1, o2, o3, o4$, a plurality of input crossbars 7, each of which is connected to one of the input ports $i1$-$i4$ and a plurality of output crossbars 8, each of which is connected to one of the output ports $o1$-$o4$.

An intersection of an input crossbar 7 and an output crossbar 8 is called crosspoint. It can be seen that each crosspoint has a dedicated queuing buffer consisting of a buffer control 5 and a buffer memory 6. The arrows indicate the direction of data flow to/from the crossbars/queuing buffers.

The number M of queuing buffer entries greatly influences system performance. A sufficient number M of queuing buffer entries can avoid data loss due to blocking situations caused by multiple connections requesting the same switch resources such as e.g. the same output port.

When designing a crossbar switch, the constant size E of a queuing buffer entry is usually chosen with respect to the packet size of the data packets of a specific application.

Applications with data packets of different size, for instance E/4, must use one queuing buffer entry of the size E, too, for storing one data packet thus leaving 75% of the queuing buffer memory space unused.

Since queuing buffer memory is often provided as on-chip static random access memory (SRAM) within a switch chip, the inefficient way of using queuing buffer memory is one of the limiting factors for further reduction of the chip-size and hence the costs of a switch chip.

SUMMARY OF THE INVENTION

Consequently, it is an object of the present invention to provide a method of operating a buffered crossbar switch that ensures a more efficient usage of queuing buffer memory and increases flexibility of a buffered crossbar switch.

According to the invention, for a buffered crossbar switch having at least one mode of operation with a specific data packet size L, this object is achieved by changing the size E and/or the number M of queuing buffer entries depending on said mode of operation.

Given a total queuing buffer memory size S per crosspoint and different data packet sizes for different modes of operation of the crossbar switch, the size E of the queuing buffer entries can advantageously be changed to equal the data packet size L of the respective mode of operation. This adaptation of the queuing buffer entry size E eliminates the waste $(E-L)/E$ of buffer memory.

According to one embodiment of the invention, the minimum buffer memory size $S=S\_min$ is to be chosen large enough to store $M=M\_min$ queuing buffer entries each having a size of $E=L\_max$, wherein $M\_min$ is the minimum number of queuing buffer entries necessary for the mode of operation characterized by the largest data packet size, $L\_max$.

Yet it might be necessary to determine the minimum buffer memory size $S=S\_min$ by considering another mode of operation with $L=L2$ and $M=M2$ for which $M2*L2>M\_min*L\_max$.

However, it is clear that $S\_min$ must be chosen to provide sufficient buffer memory for each mode of operation. $M\_min$ is often obtained by simulation, whereas the queuing buffer entry size E should equal the data packet size L, as already stated above.

A further embodiment of the invention is characterized by changing the queuing buffer entry size E to a fraction $L'=L/R$ of the data packet size if operating a plurality of R crossbar switches in parallel in an expansion mode.

As described above, expansion mode is characterized by parallel processing of data packets by a plurality of R crossbar switches. Hence in expansion mode each of the R crossbar switches has to handle portions of data packets having the size $L'=L/R$.

These portions $L'$ are smaller than the data packet size L, e.g. for $R=2$ crossbar switches working in parallel, the portions $L'$ have only half the size L of a data packet.

Thus, in expansion mode the buffer memory can hold twice the number M of queuing buffer entries as compared to a single chip operation demanding a queuing buffer entry size of $E=L$. This increase of queuing buffer entries contributes to system performance.

There is a further advantageous effect concerning queuing buffer memory organization with buffered crossbar switches. As already stated above, crossbar switches are usually designed for scalability to form expanded crossbar switches. Since in expansion mode each scalable crossbar switch only handles a fraction of a data packet being processed, the routing information of said data packet is only available in one of said switches and must be transmitted to the remaining switches, which is done via an external bus system connecting said crossbar switches.

Said routing information consists of a bit-mask comprising at least as many bits as there are output ports/buffers available. If a port is selected for output, the corresponding bit in the bit-mask has to be set, otherwise it has to be cleared.

State of the art systems reduce said routing information to be able to handle high data rates, which is achieved by providing fewer bits for the bit-mask. In consequence, each bit of the reduced bit-mask represents a group containing a plurality of output ports. Selecting a specific output port is performed by choosing the group said specific output port belongs to and setting the corresponding bit of the bit-mask denoting this group.

A data packet that is to be written to the output buffer of said specific output port is simultaneously written to every output buffer corresponding to the output ports belonging to the group specified. Since in a further step the data packet is only output at the specific output port, it is only read from the corresponding output buffer. The buffer entries of the remaining output buffers said data packet has been written to are not evaluated. This waste of buffer entries requires a comparatively large number M of queuing buffer entries to be provided for expansion mode. However, the queuing buffer entry size E can be chosen comparatively small, since only fractions of data packets are to be handled by a single switch in expansion mode.

For single chip operation, the routing information is not to be transmitted to other switches. Thus, a reduction of the bit-mask as described above is not necessary, i.e. every output port/buffer can be selected individually by setting the corresponding bit. As a consequence, in single chip operation there is no waste of queuing buffer entries, but compared to expansion mode, the queuing buffer entry size E must be chosen to fit the size of a data packet.

As a result, by using the method according to the invention, the queuing buffer memory size S can be relatively small compared to known systems, since the invention provides for a highly flexible queuing buffer management operating the crossbar switch with maximum resource efficiency.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
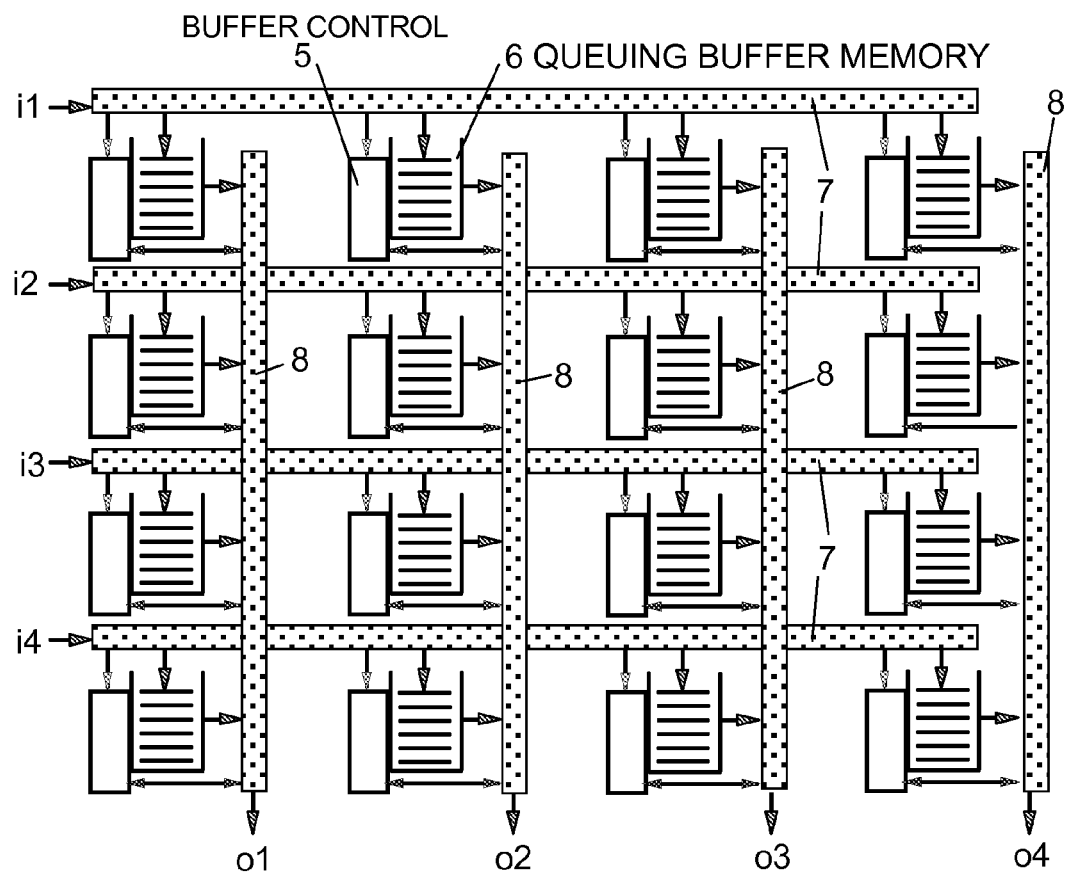
FIG. 1 shows a section of a buffered crossbar switch as already explained above.
Figure 2:
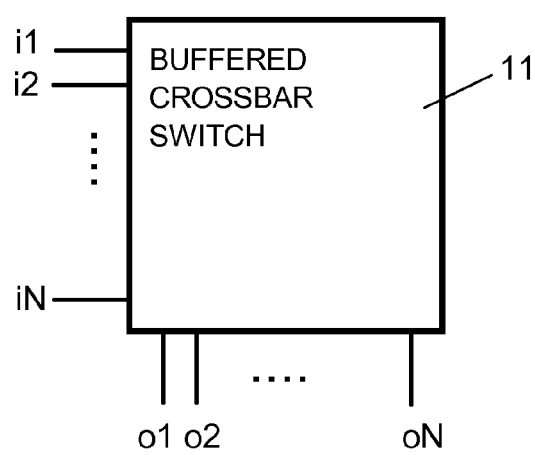
FIG. 2 shows a buffered crossbar switch.

FIG. 2 shows a buffered crossbar switch 11 consisting of a plurality of sections as depicted in FIG. 1. It has N=32 input ports i1, . . . , iN and 32 output ports o1, . . . , oN.

Figure 3:
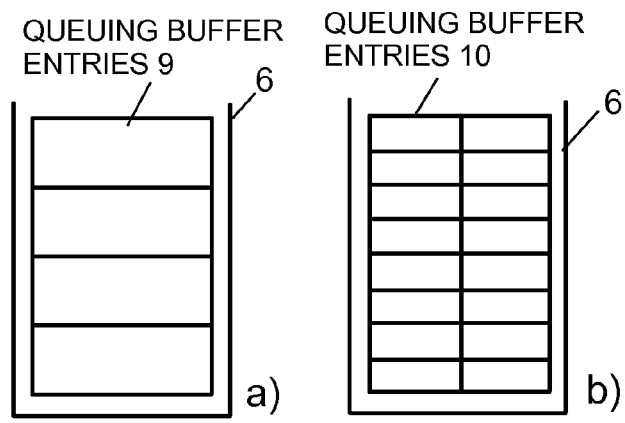
FIG. 3 shows two variants (a, b) of partitioning a queuing buffer memory.

Each queuing buffer of the crossbar switch 11 contains a queuing buffer memory 6 as depicted in FIG. 3.

Further, FIG. 3 shows two variants of partitioning the queuing buffer memory 6 of FIG. 1 having the size S. The variant of FIG. 3a) contains M=4 queuing buffer entries 9 each having the size $E=E\_a$.

In a first mode of operation, a single crossbar switch 11 is used handling data packets of the size $L=E\_a$. FIG. 3a) shows the queuing buffer memory 6 of this single crossbar switch 11. Since the size $E=E\_a$ of the queuing buffer entries 9 equals the data packet size $L=E\_a$, the complete buffer memory 6 of the size S can be used for storing data packets.

Figure 5:
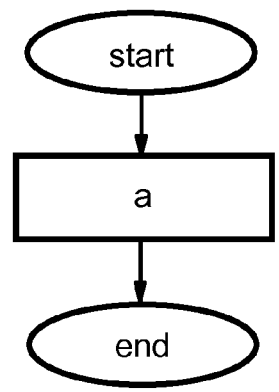

For a second mode of operation handling data packets with a size L' different from $E\_a$, it is possible to change the size E accordingly, which is done in step a) shown in the flow chart of FIG. 5. This results in a new partitioning of the queuing buffer memory 6 thus yielding a new number M' of queuing buffer entries.

M' generally depends on L' in that it is possible to create new queuing buffer entries in the queuing buffer memory 6 if the size E of the queuing buffer entries is reduced. Vice versa, an increase of the queuing buffer entry size E results in a reduction of the number M of queuing buffer entries.

Figure 4:
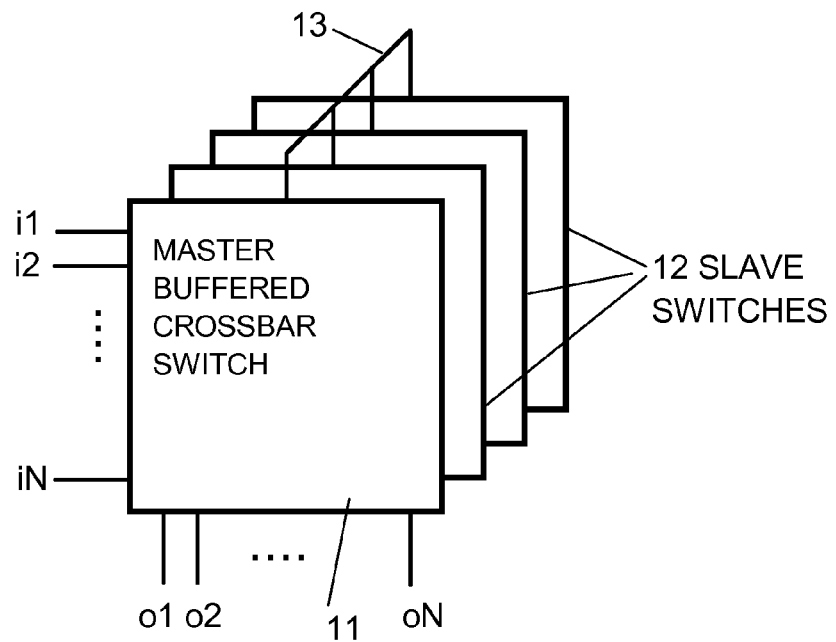
FIG. 4 shows four crossbar switches operating in expansion mode and FIG. 5 shows a flow chart of an embodiment of the method according to the invention.

The second mode of operation is expansion mode which is characterized by a plurality of R=4 crossbar switches 11, 12 working in parallel as can be seen in FIG. 4. The master switch 11 controls three slave switches 12 via an external bus system 13.

The input/output ports i1, . . . , iN, o1, . . . , oN of the switches 11, 12 are configured such that each switch only receives a portion of an incoming data packet. The size L' of such a portion of a data packet is determined by the number R of switches working in parallel according to $L'=L/R$, in this case $L'=L/4$.

I.e. when operating R=4 crossbar switches 11, 12 in expansion mode, each switch only has to handle portions of data packets having the size $L'=L/4$.

The adaptation of the queuing buffer entry size E in the second mode of operation leads to $E=E\_b=L'$. The new queuing buffer entry size $E\_b$ equals the size L' of a portion of a data packet to be processed by a single switch 11, 12.

In turn, since $L'=L/4$, the number M' of queuing buffer entries can be increased by the factor R=4. Thus, the queuing buffer 6 of FIG. 3b) contains $M'=M*4$ queuing buffer entries 10 each having the size L'.

With this adaptation of the queuing buffer entry size E from $E=E\_a$ for the first mode of operation to $E=E\_b$ for the second mode of operation, expansion mode, no queuing buffer memory is wasted.

The possibility of adapting the queuing buffer entry size E provides a flexible crossbar switch that can be used with many applications involving different data packet sizes L.

The method according to the invention is particularly interesting for operating a plurality of crossbar switches in parallel in expansion mode, though it is not limited to this mode.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of operating a buffered crossbar switch having at least one mode of operation with a specific data packet size (L) having at least one queuing buffer, said crossbar switch including a plurality (R) of crossbar switches for operation in parallel, said method comprising:
   queuing buffer entries;
   changing the size (E) or number (M) of said queuing buffer entries depending on said mode of operation; and
   changing the queuing buffer entry size (E) to a fraction (L'=L/R) of said data packet size (L) when operating said plurality (R) of crossbar switches in parallel in an expansion mode.

2. The method according to claim 1, further comprising changing said size (E) of queuing buffer entries to said data packet size (L).

3. The method according to claim 1 further comprising:
choosing the memory size of said queuing buffer to be large enough to store M=M_min queuing buffer entries each having a length of L=L_max, wherein M_min is the minimum number of queuing buffer entries necessary for the mode of operation characterized by the largest data packet size, L_max.

4. The method according to claim 1 wherein said crossbar switch comprises 32 input ports (i1, . . . , i32) and/or or 32 output ports (o1, . . . , o32).

5. The method according to claim 1 wherein said queuing buffer comprises 16 queuing buffer entries of 80 bytes in a first mode of operation, and said queuing buffer comprises 32 queuing buffer entries of 40 bytes in a second mode of operation, and said queuing buffer comprises 64 queuing buffer entries of 20 bytes in a third mode of operation.

6. The method according to claim 5, wherein said first mode of operation is a single chip operation mode, wherein said second mode of operation is an expansion mode with two crossbar switches working in parallel, and wherein said third mode of operation is an expansion mode with four crossbar switches working in parallel.

* * * * *